US011108656B1

(12) United States Patent
Nelson et al.

(10) Patent No.: US 11,108,656 B1
(45) Date of Patent: Aug. 31, 2021

(54) TECHNIQUES FOR ALLOCATING AND MANAGING TELECOMMUNICATION RESOURCES

(71) Applicant: Bandwidth, Inc., Raleigh, NC (US)

(72) Inventors: Michael Nelson, Apex, NC (US); Nicholas Porillo, Rochester, NY (US); Luther Wright, Spencerport, NY (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 17/193,008

(22) Filed: Mar. 5, 2021

(51) Int. Cl.
*H04L 12/24* (2006.01)
*H04L 12/26* (2006.01)
*G06F 9/54* (2006.01)

(52) U.S. Cl.
CPC .......... *H04L 41/5054* (2013.01); *G06F 9/541* (2013.01); *H04L 43/0876* (2013.01)

(58) Field of Classification Search
CPC ................. G06F 9/5027; G06F 9/5016; G06F 2009/45595; G06F 11/2033; G06F 2201/805
See application file for complete search history.

(56) References Cited

U.S. PATENT DOCUMENTS

| | | | | |
|---|---|---|---|---|
| 2002/0161914 A1* | 10/2002 | Belenki | ................. | H04L 47/762 709/235 |
| 2011/0098035 A1* | 4/2011 | Frenger | ............. | H04W 74/0866 455/423 |
| 2016/0140001 A1* | 5/2016 | Kulkarni | ............... | G06F 9/5066 714/4.12 |
| 2016/0219117 A1* | 7/2016 | Marlatt | ................. | H04L 67/322 |
| 2020/0401452 A1* | 12/2020 | Piercey | ............... | G06F 9/45558 |
| 2021/0045131 A1* | 2/2021 | Vivanco | ............. | H04W 72/042 |

* cited by examiner

*Primary Examiner* — Mahran Y Abu Roumi
(74) *Attorney, Agent, or Firm* — Gregory Stephens (57) ABSTRACT

In some implementations, a computer may during a repeating interval in a local GCAC node: (a) receiving and storing key data from one or more other GCAC nodes, the key data indicative of resource usage data for each key in the respective one or more other GCAC nodes wherein each key is associated with an allocation limit equal to a number of resources it may use at any given time across all GCAC nodes; (b) storing current key data, the current key data indicative of the resource usage data for each key in the local GCAC node; (c) determining estimated network-wide key data, the estimated network-wide key data indicative of an estimated network-wide resource usage across all GCAC nodes for each key, the estimated network-wide key data based on a combination of the current key data for the local GCAC node and a weighted multiple of the key data in each of the one or more other GCAC nodes; (d) storing the estimated network-wide key data for each key; and (e) repeating steps (a)-(d) during each interval.

27 Claims, 7 Drawing Sheets

TECHNIQUES FOR ALLOCATING AND MANAGING TELECOMMUNICATION RESOURCES

TECHNICAL FIELD

Examples described herein are generally related to techniques for allocating, tracking, and managing resources within a telecommunications network.

BACKGROUND

The processes for tracking customer resource allocation within a communications network across multiple data centers with multiple nodes each is extremely complex. Customer resource allocation tracking is necessary to accurately estimate usage by each customer pursuant to any terms of service agreements. The process should be accurate to within specified tolerances and dynamic enough to be relevant for any given time interval. Thus, what is needed are techniques that allow the plurality of nodes within a network to be able to calculate and maintain a working knowledge of the resource allocation of the entire network without disrupting a node's ability to allocate and manage resources.

In some aspects, techniques for allocating and managing resources associated with keys in a communications network spread across a plurality of data centers in different geographic locations are described. Each data center may include one or more global call access control (GCAC) nodes networked together and communicable with one another across all data centers. Some of the techniques described occur repeatedly during sequential predetermined repeating intervals within each of the GCAC nodes. For instance, a GCAC node may receive and store key data from one or more other GCAC nodes. The key data may be indicative of resource usage data for each key in the respective one or more other GCAC nodes. Further, each key may be associated with an allocation limit equal to a number of resources it may use at any given time across all GCAC nodes. The GCAC node may store current key data where the current key data may be indicative of the resource usage data for each key in the GCAC node. The GCAC node may determine a current estimate of network-wide key data that may be indicative of the network-wide resource usage across all GCAC nodes for each key. Further, the current estimated network-wide key data may be based on a combination of the current key data for the GCAC node and a weighted multiple of the key data in each of the other GCAC nodes. The GCAC node may then store the estimated network-wide key data for each key. This process may be repeated for each resource of each key for each GCAC node.

In some aspects, determining the current usage for each resource for each key in the GCAC node may include retrieving the current estimate of the usage for each resource for each key in each of the one or more other GCAC nodes and summing it with the (local) GCAC node resource usage to obtain an estimated network-wide resource usage for each resource for each key.

In some aspects, techniques are described for weighting key data that is not as current as the present interval. For instance, a decay factor (DF) equal to 1/(historical event window size) may be calculated. The historical event widow size may be predetermined and further determines a number of look back intervals relevant to determining the current estimate of the usage of a resource. The weighting calculation may start with the current interval and increment through each of the lookback intervals from most recent to least recent. For each interval, a weighting factor (WF) of DF may be applied whenever V is zero for an interval and a weighting factor (WF) of 1 may be applied to V for the first interval where V is not zero. Thereafter, WF may be reset to (WF-DF) for the next interval in which V is not zero. Next, a weighted resource usage data value (WV) for each interval may be obtained by calculating (WF×V). These steps may be repeated until there is a WV and a WF for each interval for the resource. A current estimate of the usage for a resource may be calculated as the sum of the weighted resource usage data values divided by the sum of the weighting factors. The process may be repeated for each resource for each key for each of the one or more other GCAC nodes.

In some aspects, in a GCAC node may receive a request from a key for a resource. The request may be parsed to identify the key and the resource requested. The GCAC node may then retrieve the estimated network-wide key data for the key making the request. The GCAC node may then determine a resource usage percentage for the resource requested based on the ratio between the estimated network-wide key data for the key making the request and the allocation limit for the key making the request. The GCAC node may then grant the request for the resource when the resource usage percentage is less than or equal to 100%. If the resource usage percentage is greater than 100%, an additional process may be implemented to determine whether to grant the request. A number range between 1 and 100 is created and a sub range from 1 to (the resource usage percentage—100) is also created. Next a random number between 1 and 100 may be generated. The request may be rejected when the random number is in the sub range.

The sub range represents the proportion above 100% for the resource usage. For instance, if the resource usage is currently at 120%, the top of the sub range will be (120−100) or 20. The sub range itself will be 1-20. Thus, for every given request, there is a 20% chance it will be rejected based on the random number generated. By randomly rejecting 20% of the requests during the interval, the network-wide resource usage will begin to converge on 100%. Having every GCAC node perform very similar operations allows for faster convergence to 100%.

DETAILED DESCRIPTION

Various embodiments may include a system, method, apparatus, and techniques to allocate and manage communication resources to maximize network capacity and ensure customers consuming such resources do so within a reasonable tolerance to the limits contractually agreed upon.

Consider a communications service provider that operates a nationwide communications network with several geographically dispersed data centers that provide points of access for customers to consume resources. These points of access may be termed global call access control (GCAC) nodes. As an example, consider a customer that wants to use the network to place or receive telephone calls. The customer contracts with the service provider and agrees to terms that limit the number of calls that can be placed per second as well as the number of concurrent calls that may be in progress. The number of calls that can be placed per second may be termed the calls per second (CPS) resource and the number of concurrent calls in progress may be termed the concurrent calls (CC) resource. The customer may be considered a "key" for purposes of this disclosure. For instance, resources are allocated to keys.

Suppose the customer is allocated a CPS of 100 and a CC of 5000 meaning they can attempt no more than 100 calls per second and can maintain no more than 5000 calls at any given moment across the entire network. These CPS and CC numbers are arbitrary for illustrative purposes only. The service provider, however, typically provides the customer access to each GCAC node within each data center network-wide. In other words, the service provider typically permits the customer to 'spend' their allocation of resources across all GCAC nodes. Trouble may arise when the customer uses multiple GCAC nodes and the resource usage sums to greater than that allocated. To prevent this, resource usage data may be shared across GCAC nodes and data centers. Decisions to allocate a resource for a new request may then be granted or denied by a given GCAC node based on a constantly updated snapshot new of a customer's current use of network resources.

While it may sound relatively simple, the processes for tracking customer resource usage across multiple data centers with multiple GCAC nodes each is extremely complex. Moreover, the time and processing power necessary to process the resource usage data to keep all nodes in sync with one another can't get in the way of running the communications network.

The techniques described herein do not rely on full synchronous data replication among all GCAC nodes, multi-phase commits, or traditional data synchronization strategies that may be excessively processing intensive and/or time consuming. Rather, the techniques described and claimed herein rely on the eventual but rapid convergence of data in a population of GCAC nodes through use of a replication algorithm. As GCAC nodes randomly communicate with one another they lean about data updates across the network-wide population of GCAC nodes and combine it with their own resource usage data to refine their own view of current network resource usage. This process is replicated continuously at specified update intervals.

This replication algorithm means that no one true consensus is ever reached for a given value associated with a resource. However, the techniques work for resource allocation management because the rate of consumption changes rapidly and can be assumed to never effectively settle on a single value. Given this assumption all resource consumption can be viewed as an estimation of an unknown exact value within a given time period. This assumption allows calculation of estimates of a constantly fluctuating value that approach a global convergence rapidly, and within a margin of error acceptable for resource management.

Using these estimates, decisions may be made with respect to specific resource allocation requests made by specific customers and received at any GCAC node in the network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

Figure 1:
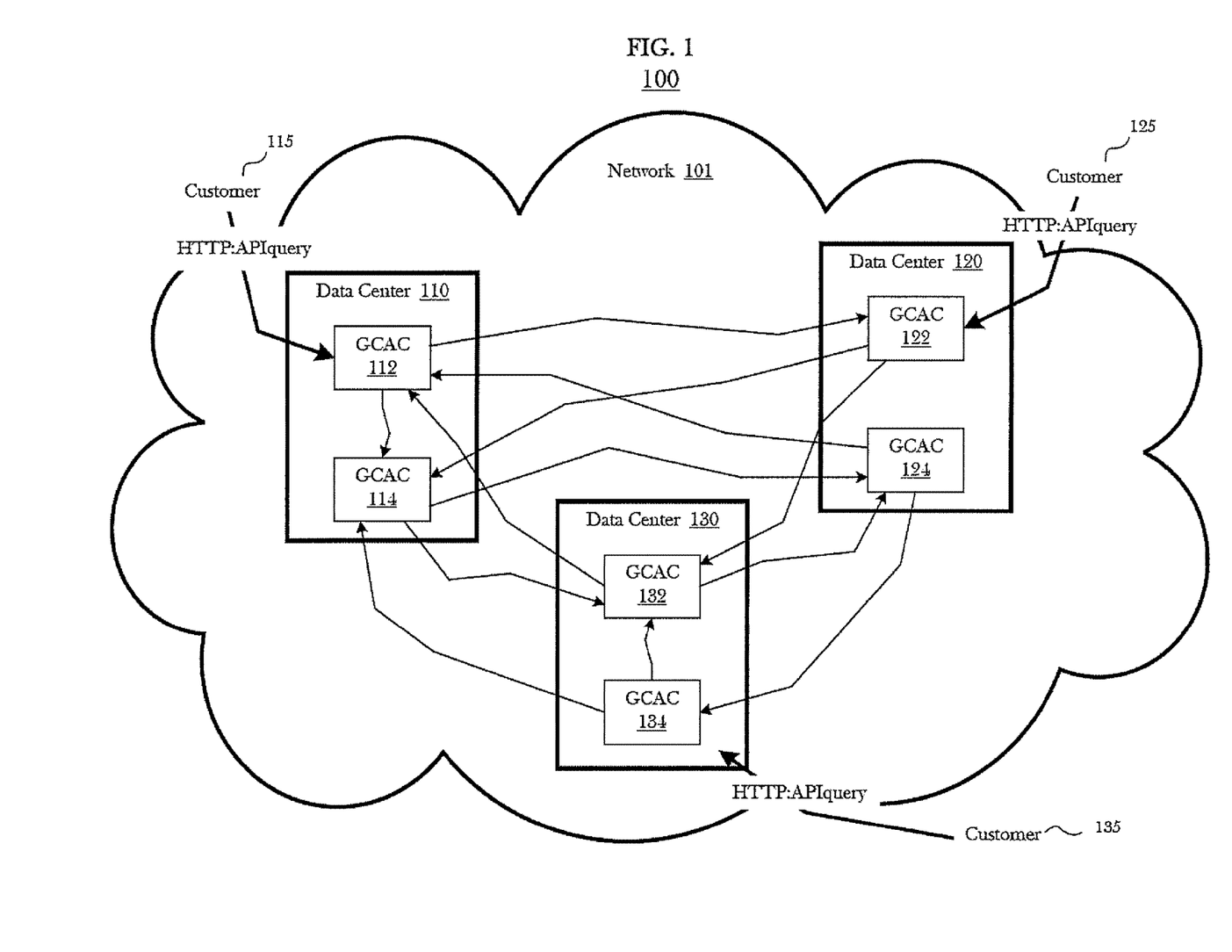
FIG. 1 illustrates an example network architecture according to an embodiment.

FIG. 1 illustrates an example network architecture 100 according to an embodiment. In this example, a network 101 (e.g., Internet or other wide scale IP network) links multiple data centers 110, 120, 130 of a communications service provider. Each of the data centers 110, 120, 130 comprise a plurality of global call admission control (GCAC) nodes 112, 114, 122, 124, 132, 134.

A data center 110, 120, 130 is a combination of hardware, software and data storage (e.g., data processing) that is networked with other data centers. The data centers 110, 120, 130 comprise the network 101 and are tasked with implementing the features and services provided by service provider. In the case of a telecommunications service provider, a data center may further comprise many additional components, modules, and computer servers including, but not limited to, session border controllers (SBCs). It should be noted, however, that not all of the components of a data center 110 in a telecommunications network have been illustrated, only those pertinent to the techniques described herein.

Each GCAC node (112, 114, 122, 124, 132, 134) may include an application programming interface (API) configured to handle requests for allocating resources over, for example, hypertext transfer protocol (HTTP). HTTP API queries may come from customers 115, 125, 135 for instance.

The GCAC nodes (112, 114, 122, 124, 132, 134) interpret requests according to a data structure that identifies the requesting party and the resource being requested. The data structures may vary without departing from the spirit or scope of the inventive techniques described herein. In this embodiment, the requesting party may be termed the 'key' and the resource requested may be mapped to a resource type. For instance, a request to make a call presented to a GCAC node API may identify ABC Co. as the key (i.e., customer making the request) and may be mapped to two (2) resources—CPS and CC. In addition, the request itself may be a SIP Invite message which may be interpreted as a request to make a call. The goal for the current GCAC node receiving the request is to be able to accurately determine that key's current and projected resource allocation before granting or denying the request. So long as there are sufficient resources still available to that key, the request can be granted.

For the illustrated examples provided herein, the 'key' has been contextualized as a customer. This a clear and obvious use case but not the only one. Keys may also represent data centers, specific equipment, specific users, etc. For instance, A session border controller or SBC may be considered a key.

An SBC is a special-purpose device that protects and regulates IP communications flows. SBCs may be typically deployed at network borders to control IP communications sessions. SBCs may be used to regulate all forms of real-time communications including VoIP, IP video, text chat and collaboration sessions. SBCs may manipulate IP communications signaling and media streams, providing a variety of functions. SBCs may provide security functions to protect against Denial of Service (DoS) and Distributed DoS (DDoS) attacks, safeguard against toll fraud and service theft, and provide media and signaling encryption to ensure confidentiality and protect against impersonation. SBCs may also normalize SIP (Session Initiation Protocol) signaling stream headers and messages to mitigate multivendor incompatibilities. SBCs may enable interworking between diverse protocols (i.e. SIP-to-H.323) or diverse codecs (i.e. g.711 to g.729 transcoding). SBCs may enforce call admission control (CAC) policies, type of service (ToS) marking, or rate limiting for service quality assurance. SBCs may further route sessions across network interfaces to ensure high availability or enable least cost routing (LCR).

In the present context, a particular SBC may be resource limited to handling 1000 CPS and 10,000 CC. Requests intended for a specific SBC may be subject to the resource allocation techniques and algorithms described herein. Similarly, data centers may be resource limited as well. Applying the techniques and algorithms to SBCs and/or data centers helps ensure the communications network itself does not become overloaded thereby causing undesirable performance characteristics. Thus, customer requests may be redirected to alternate data centers or SBCs when the current data center or SBC is approaching its limits.

To efficiently handle resource requests, a GCAC node 112 should consider the total network resource allocation of the requested resource for that key at the time of the request. For purposes of clarity, a GCAC node receiving a request may be distinguished from all other GCAC nodes (114, 122, 124, 132, 134) in the same or other data centers 110, 120, 130. Consider a slew of new call requests (e.g., SIP Invite messages) to GCAC node 112 emanating from the same key (e.g., customer). If that key is currently running network-wide at 80% of their limit of concurrent calls (CCs), there is room for GCAC node 112 to grant the requests. However, if that key is currently running network-wide at 80% of their limit of concurrent calls (CCs), logic dictates GCAC node 112 should randomly reject 20% of the requests during the current update interval because it may be assumed the other GCAC nodes (114, 122, 124, 132, 134) will also be rejecting resource requests at a similar rate.

Before arriving at this conclusion, GCAC node 112 must be able to determine that the key is currently running network-vide at 120% of their limit of concurrent calls (CCs). The process starts with the sharing of resource usage data for each key (i.e. key data) among GCAC nodes. However, a full mesh sync in which every GCAC node updates every other GCAC node with its key data on a periodic basis (i.e., once per intel) may consume too much time and processing resources. A lighter simpler data synchronization technique may be employed that can provide results well within an acceptable tolerance of accuracy.

Each GCAC node typically runs on the same update interval as every other GCAC node. This interval may be adjusted to suit particular needs and may also depend on the number of total GCAC nodes in the network. In the example discussed here, an update interval of 50 ms provides results within acceptable tolerances It should be noted that while each GCAC node may use the same interval (e.g., 50 ms) for sending out its own key data, the start and stop time for each GCAC node update interval is not necessarily in sync and does not need to be. Besides the update interval, another factor is determining how many GCAC nodes to which to send out a key data update. It has been found that sending an update to just two other randomly selected GCAC nodes (i.e., a partial mesh sync) yields satisfactory results and scales well regardless of the total number of GCAC nodes. Each time a GCAC node sends an update to another GCAC node it may be deemed a replication event. By fixing the update interval and the number of other GCAC nodes to update per interval, the number of replication events per second may be calculated. In the present example, there are 2 replication evens every 50 ms yielding 40 replication events per second.

The example in FIG. 1 shows a total of six (6) GCAC nodes. A full mesh sync would require sending the updates to five (5) other nodes every update interval. Using an interval of 50 ms yields one hundred (100) replication events every second vs. 40 replication events every second using the partial mesh sync of two (2) GCAC nodes each update interval. To equalize the number of replication events, one would have to extend the interval period for the full mesh sync 2.5 times to 125 ms. In a more realistic scenario where there are more than six (6) total GCAC nodes in the entire network, the update interval for a full mesh sync is extended dramatically. For instance, in a 21 GCAC node system, to keep the same number of replication events, the interval update would go from 50 ms to 500 ms. In a 41 GCAC node system, to keep the same number of replication events, the interval update would go from 50 ms to 1000 ms. The shorter update interval provides for a smoother less volatile and more predictable usage of network resources avoiding significant spikes or dips appearing at any one specific GCAC node. Running a full mesh sync on the shorter update interval dramatically increases the number of replication events. The time and processing overhead required to achieve a full mesh sync on a short update interval would significantly adversely affect and degrade overall network performance making such an option not feasible.

Returning to FIG. 1, it can be seen that each GCAC node (112, 114, 122, 124, 132, 134) has two arrows out indicating that it is sending its own key data to two other randomly selected GCAC nodes per update interval. FIG. 1 is a snapshot of one update interval wherein each arrow out represents a replication event for that GCAC node during that interval. While the update intervals are not synced among the GCAC nodes (112, 114, 122, 124, 132, 134), it is easier to illustrate FIG. 1 as if the update intervals were synced across all GCAC nodes (112, 114, 122, 124, 132, 134). An illustration of the next interval would yield outbound arrows to different randomly selected GCAC nodes (112, 114, 122, 124, 132, 134) as one of the rules in the system is that one GCAC node will not update the same GCAC node in two consecutive intervals. This rule ensures that the data from each GCAC node gets spread to the entire network of GCAC nodes with a greater historical relevancy. Thus, while a GCAC node will send out its own GCAC node key data to two other randomly selected GCAC nodes each update interval, the same GCAC node may continuously randomly receive GCAC node key data from other GCAC nodes in the network. The combination of the current GCAC node 112 key data and continuously received other GCAC node (114, 122, 124, 132, 134) key data allow the current GCAC node to estimate current network wide key data. This information is then used to evaluate resource requests from keys received by each GCAC node (112, 114, 122, 124, 132, 134) during the current update interval.

Figure 2A:
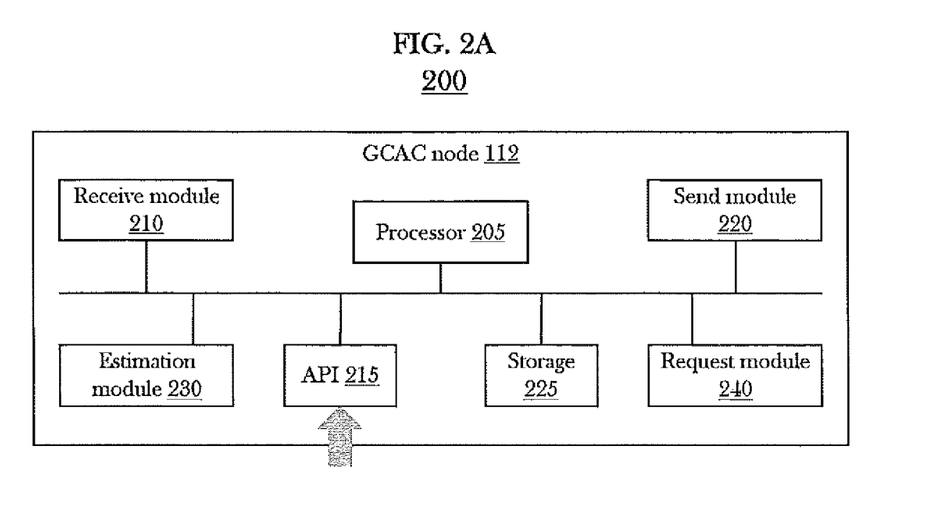
FIG. 2A illustrates a global call admission control (GCAC) node including some of its components.

FIG. 2A illustrates a GCAC node 112 including some of its components. Recall, the collection of GCAC nodes (112,

114, 122, 124, 132, 134) are spread throughout the network 101. Further, GCAC nodes (112, 114, 122, 124, 132, 134) may be grouped within data centers 110, 120, 130. Each GCAC node may include a processor 205 (or processors), one or more application programming interfaces (API) 215 configured to accept resource requests from extremal components associated with keys, one or more data storage components 225 configured to store GCAC node key data, a receive module 210 configured to receive other GCAC node key data, a send module 220 configured to send current GCAC node key data, an estimation module 230 configured to estimate current network-wide key data, and a request module 240 configured to receive and process resource requests of keys in cooperation with the one or more APIs 215.

Figure 2B:
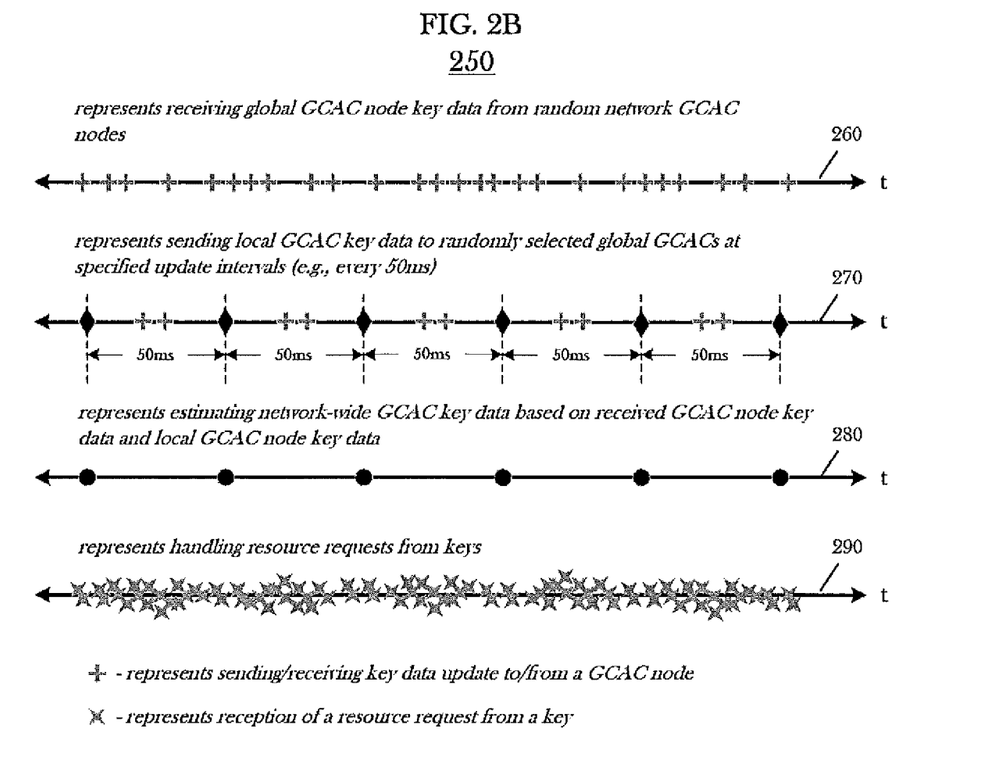
FIG. 2B illustrates a series of timelines for operations of a GCAC node according to an embodiment.

FIG. 2B illustrates a series of timelines 250 for operations of a GCAC node (e.g., 112) according to an embodiment.

Timeline 260 may represent the reception of key data from other GCAC nodes (114, 122, 124, 132, 134). Each tick mark on timeline 260 indicates received key data from one of the other GCAC nodes (114, 122, 124, 132, 134) in the network. The key data received includes a snapshot of the resources currently allocated by that particular other GCAC node (114, 122, 124, 132, 134) on a per key basis.

Other GCAC node (114, 122, 124, 132, 134) key data arrives randomly to the current GCAC node 112 and may be stored locally for later processing. The received other GCAC key data may be associated with the particular other GCAC node (114, 122, 124, 132, 134) that sent it and time stamped. The time stamp allows the network-wide resource estimation process (described below) to weight the data based on its historical relevancy. For instance, other GCAC node key data that has not been updated as recently may be weighted less when estimating current network-wide key data.

As previously mentioned, each GCAC node (112, 114, 122, 124, 132, 134) may be operating on the same update interval length (e.g., 50 ms) but not synced as to start and stop time. In addition, each GCAC node (112, 114, 122, 124, 132, 134) randomly selects which other GCAC nodes (112, 114, 122, 124, 132, 134) to update during their send cycle. As a result, the reception of other GCAC node (114, 122, 124, 132, 134) key data may appear random or haphazard. Over time, however, the other GCAC node (114, 122, 124, 132, 134) key data received smooths out and provides relevant data for the estimation process within the current GCAC node 112 to function well within system tolerances.

Timeline 270 may represent sending current GCAC node 112 key data to other GCAC nodes (114, 122, 124, 132, 134) according to a system defined update interval (e.g., 50 ms). In addition, the system may also define how many other GCAC nodes (114, 122, 124, 132, 134) to update each internal. In the illustration described in this embodiment, the number of other GCAC nodes (114, 122, 124, 132, 134) to update each interval is two (2). This number may be modified within the system according to system defined tolerances.

To ensure that each GCAC node (112, 114, 122, 124, 132, 134) sends and receives useful key data, another system rule may be that a GCAC node 112 cannot update the same other GCAC node (114, 122, 124, 132, 134) in consecutive intervals. Thus, for each update interval, a GCAC node 112 will randomly select two other GCAC nodes (114, 122, 124, 132, 134) to update. If one of the other GCAC nodes (114, 122, 124, 132, 134) selected is the same as the last update interval, it is discarded and GCAC node 112 selects another GCAC node (114, 122, 124, 132, 134) until the selected other GCAC nodes (114, 122, 124, 132, 134) for the present update interval are both different from the last update interval. The key data sent includes a snapshot of the resources currently allocated by GCAC node 112 on a per key basis.

Timeline 280 may represent the algorithms used by a GCAC node 112 to estimate the network-wide resource allocation on a per key basis. The key data used in the estimation process is a combination of the GCAC node 112 key data and the currently stored other GCAC node (114, 122, 124, 132, 134) key data. A more descriptive explanation of the estimation process is described below. A new estimation may be performed once per update interval (e.g., 50 ms) resulting in a new-view of the overall network every update interval.

Timeline 290 may represent how the current GCAC node 112 uses the network-vide estimated key data to handle resource requests during the current update interval. The estimation results may be used by GCAC node 112 to determine whether to grant or deny a resource request In general, a resource request may be granted if the estimation algorithm determines the key making the request is sufficiently within its usage limits for the resource requested. If the estimation algorithm determines the key making the request is above the resource allocation limit, the request may be denied based on an estimation of the degree to which the requested resource is over-allocated. For instance, if the key making the request is determined to be utilizing 120% of an allocated resource, GCAC node 112 may randomly reject 20% of resource requests during the current update interval with the assumption that the rest of the other GCAC nodes (114, 122, 124, 132, 134) are doing the same. That way the network-vide total resource allocation for the key making the request will converge back toward 100%. As each interval in each GCAC node yields new network-wide resource allocation estimates based on updated key data, the proportion of requests that may be rejected is also updated. By using a relatively short update interval, all GCAC nodes may alter the proportion more frequently and yield a better overall estimation of network-wide resource usage. This results in smoother less volatile total resource usage for the network equipment in addition to the ability to better enforce resource allocation limits network-wide for each key.

FIGS. 3-6 illustrate a set of logic flows. These logic flows may be representative of some or all of the operations executed by one or more logic, features, or devices described herein, such as any devices or systems described above with references to other figures herein. In the illustrated examples shown in FIGS. 3-6, the logic flows may comprise one or more steps or processes involved in allocating and managing resources in a communications network as described elsewhere herein. The embodiments, however, are not limited to the number, type, order or arrangement of steps shown in FIGS. 3-6.

Figure 3:
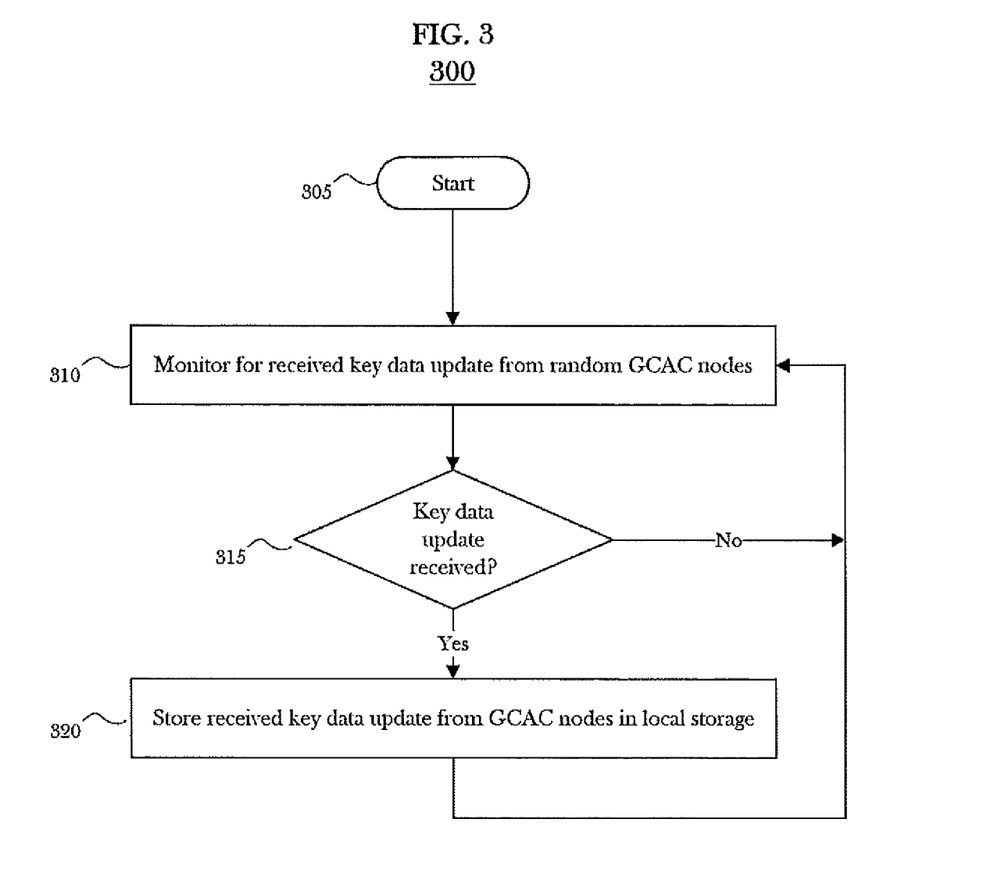
FIG. 3 illustrates a logic flow diagram for sharing GCAC node resource data according to an embodiment.

FIG. 3 illustrates a logic flow diagram 300 for sharing GCAC node key data according to an embodiment. Recall, the techniques described herein rely on the eventual but rapid convergence of key data in a population of GCAC nodes. As the GCAC nodes randomly communicate with one another at specific update intervals, they learn about key data updates across the global population of GCAC nodes comprising the network in its entirety and combine it with their own key data to refine their own view of current network-wide resource usage data. The updated key data is then used by each GCAC node when responding to resource usage requests from keys. This key data updating process is replicated continuously at the specified update intervals.

The logic diagram 300 of FIG. 3 addresses the part of the process in which a GCAC node 112 receives key data updates from random other GCAC nodes (114, 122, 124, 132, 134) in the network 101. FIG. 3 is described from the perspective of a single GCAC node 112 but the same process is simultaneously occurring at every other GCAC node nodes (114, 122, 124, 132, 134) in the network 101. The receive process begins at step 305 when receive module 210 is executed by processor 205. Receive module 210 then monitors incoming data to GCAC node 112 for key data updates from other GCAC nodes (114, 122, 124, 132, 134) at step 310. As previously described, key data updates may be comprised of resource usage data for each key currently utilizing resources in the network 101. A decision block 315 determines if a key data update has been received from other GCAC node (114, 122, 124, 132, 134). If no key data update has been received, control returns to the monitoring step 310.

When a key data update is received, die updated key data may then be stored in local storage 225 at step 320. When storing the updated key data, receive module 210 first determines which other GCAC node (114, 122, 124, 132, 134) provided the updated key data. Receive module 210 may then accesses local storage 225 and overwrites the key data currently stored for the GCAC node providing the key data update. The key data update data may comprise identifiers for keys and the resources those keys are currently using at that other GCAC node. The updated key data may also be timestamped. The time stamp may be used by the estimation module 230 when determining how to weight the key data for that other GCAC node in estimating network-wide resource usage for the key. For example, the older the other GCAC node key data, the less weight it may be given. Once the updated key data has been stored in step 320, control is returned to monitoring step 310.

Figure 4:
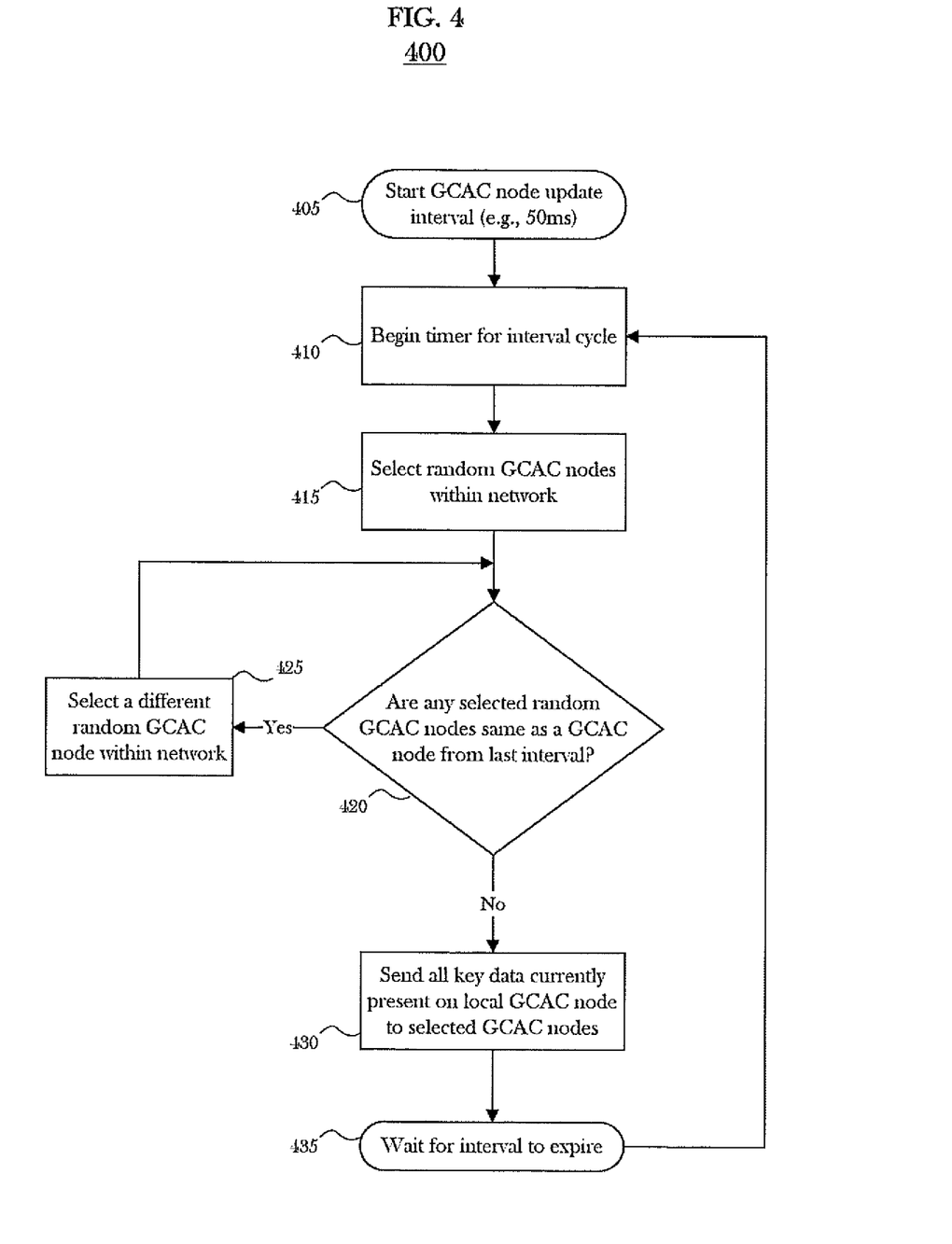
FIG. 4 illustrates a logic flow diagram for receiving GCAC node resource data according to an embodiment.

FIG. 4 illustrates a logic flow diagram 400 for receiving GCAC node key data according to an embodiment. The logic diagram 400 of FIG. 4 addresses the part of the process in which a GCAC node 112 shares its local key data with other GCAC nodes (114, 122, 124, 132, 134) on a predetermined periodic basis. FIG. 4 is described from the perspective of GCAC node 112 but the same process is simultaneously occurring at every other GCAC node (114, 122, 124, 132, 134) in the network 101. The send or share process begins with the commencement of an update interval timer at step 405. In this example, the update interval has been predetermined and set to 50 ms. This update interval may be set (and reset) network-wide and pushed to every GCAC node (112, 114, 122, 124, 132, 134) in the network 101. While each GCAC node (112, 114, 122, 124, 132, 134) may use the same update interval, the interval is not necessarily synchronized across all the GCAC nodes (112, 114, 122, 124, 132, 134). For example, the start/stop times for the interval in GCAC node 112 and GCAC node 134 may be offset from one another but the interval length is identical. It should be noted that one could fathom a reason to set different update intervals for certain GCAC nodes in other embodiments so it is not precluded from the techniques described herein.

Send module 220 within current GCAC 112 may then initiate an update interval cycle timer at step 410. Send module 220 may then randomly select other GCAC nodes (114, 122, 124, 132, 134) to which to send its key data during this particular update interval cycle at step 415. In this example, it has been predetermined that sending to two (2) other GCAC nodes (114, 122, 124, 132, 134) will achieve the desired results. This number may also be set and reset system wide. Once the other GCAC nodes (114, 122, 124, 132, 134) have been selected in step 415, decision block 420 determines if the selected other GCAC nodes (114, 122, 124, 132, 1134) are different from the other GCAC nodes (114, 122, 124, 132, 134) that received key data updates in the immediately previous update interval. If one or more of the selected other GCAC nodes (114, 122, 124, 132, 134) was a recipient in the immediately preceding update interval, the send module 220 may reselect from the pool of other GCAC nodes (114, 122, 124, 132, 134) at step 425. Once reselection is complete, control returns to decision block 420 and this process may be repeated until all selected other GCAC nodes (114, 122, 124, 132, 134) are different from those receiving key data updates during the immediately preceding update interval. At this point, send module 220 sends GCAC node 112 key data to the selected other GCAC nodes (114, 122, 124, 132, 134) where it is processed by the receiving other GCAC node (114, 122, 124, 132, 134) according to the process set out in the logic diagram of FIG. 3. Once send module 220 has sent GCAC node 112 key data to the selected other GCAC nodes (114, 122, 124, 132, 134), it waits at step 435 for the current update interval to expire. Upon expiration, control is returned to step 410 to kick off the next interval update cycle.

Figure 5:
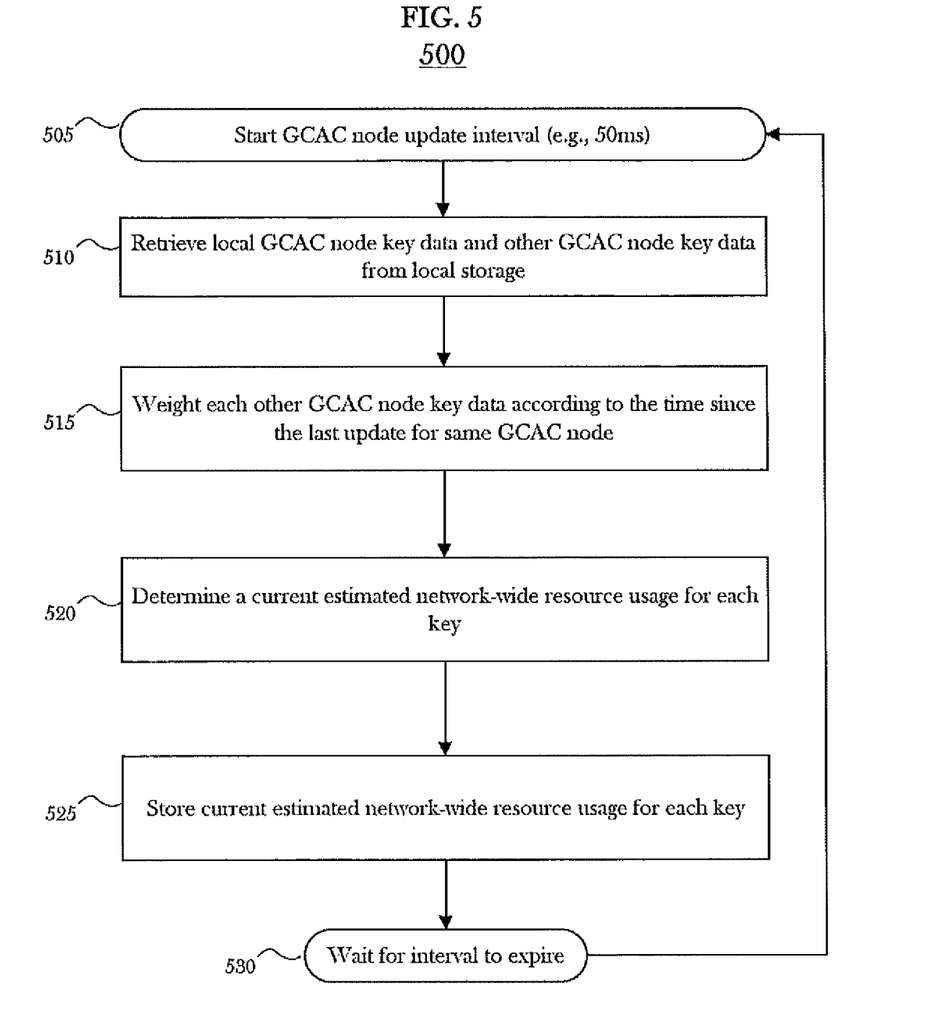
FIG. 5 illustrates a logic flow diagram for processing received GCAC node resource data according to an embodiment.

FIG. 5 illustrates a logic flow diagram 500 for processing received GCAC node key data according to an embodiment. Each GCAC node forms its own network-wide estimation of total resource allocation per key once per interval. This estimation is then used for the duration of the interval when responding to resource requests from keys. By having a sufficiently accurate estimation of current network-wide key data, more intelligent decisions may be made when responding to new resource requests from keys. Moreover, when all GCAC nodes are participating, the estimations become more accurate and the subsequent decisions made when responding to new resource requests from keys ensure that network-wide resource allocation remains within allowed tolerances on a per key basis.

For example, utilizing the techniques herein, a key may, at times, run at greater than one hundred percent of allocated network capacity but only by a relatively small amount. In other words, it may be possible for a key to run at 102% of their allotted limits but likely not 120% The goal is not necessarily to be perfect (e.g., never exceed 100%) but rather prevent excessive overages of allocated network resource usage.

The estimation module 230 may also run on the same interval as the send module 220. It is not necessary that the intervals be exactly synchronized to the same start/end times however. It is also possible that the estimation interval may be different from the send interval depending on the processing capacity of the GCAC nodes and the performance of the converging algorithm. For example, during expected periods of greater network resource utilization (e.g., higher calling volumes), the estimation algorithm will provide better results using a shorter interval as the total resource allocation for one or more keys between intervals may be closer to allocated limits. Conversely, during expected periods of lesser network resource utilization (e.g., lower calling volumes), the estimation algorithm may provide sufficient results using a longer interval as the total resource allocation for one or more keys between intervals may not be as close to allocated limits. For purposes of this embodiment, an estimation interval that is the same as the send interval is used.

The estimation process starts with estimation module 230 initiating a clock timer for the desired interval at step 505. Estimation module 230 may then retrieve from local storage 225 the most recent local GCAC node 112 and other GCAC node (114, 122, 124, 132, 134) key data for each key at step 510. GCAC node 112 key data is always current while the other GCAC node (114, 122, 124, 132, 134) key data may not be completely current. However, the key data for many other GCAC nodes will be near current as it may have been received very recently. Recall, the stored other GCAC node (114, 122, 124, 132, 134) key data gets timestamped. The time stamp allows estimation module 230 to determine how current each other GCAC node's key data is further allowing estimation module 230 to apply a weighting factor to the key data at step 515. For example, key data that is older (e.g., received earlier) may be weighted less than key data that is more current. The weighting factor may be calculated according to an algorithm.

In one embodiment, the weighting factor for key data may be calculated using a decay of (1/(historical event window size)) where historical event window size is a configurable value of how many historical events may be tracked of any given GCAC node's updates. The historical event window size may also be correlated to an interval. Thus, there can be no more than one historical event per interval per GCAC node.

This decay may be used to weight values from data from missing or older intervals against the most recent data available. In one example, five (5) may be used as the configured window size (meaning at any one time the last 5 replication events received from any given node are available). In all cases the most recent update data from a given GCAC node within the historical event window is given a weight of 1 (i.e., normal weight). Values older than the most recent available data are weighted using the decay subtracted from the next most recent values given weight. Intervals between the interval containing the most recent value and the current interval that do not have any data are given a weight of 1 unit of decay (e.g., ⅕) and are calculated as having a value of 0. Any data that is older than will fit in the historical event window is discarded.

Here is an example of the calls per second (CPS) resource of a random GCAC node where the historical event window size is 5 and the two most recent intervals have no updated CPS resource data. Given the sample values below, the weighted CPS resource data value is calculated as follows:

Decay: (1/5) = 0.2

| | | |
|---|---|---|
| Current Interval | CPS: 0 (No Data Available) | Weight: .2 |
| First Previous Interval | CPS: 0 (No Data Available) | Weight: .2 |
| Second Previous Interval | CPS: 35 | Weight: 1 |
| Third Previous Interval | CPS: 22 | Weight: .8 |
| Fourth Previous Interval | CPS: 12 | Weight: .6 |

A weighted average calculation may be determined as the sum of the product of the weight multiplied by the CPS value for each interval, divided by the sum of the weights.

$$((0.2 \times 0)+(0.2 \times 0)+(1 \times 35)+(0.8 \times 22)+(0.6 \times 12)/(0.2+0.2+1+0.8+0.6)$$

$$(0+0+35+17.6+7.2)/(2.8)$$

$$(59.8)/(2.8)=21 \text{ CPS (with rounding)}$$

In this scenario, the most recent data was from the second previous interval, so the weighting algorithm has decayed the value of data from preceding intervals. As a result, the impact on the global estimation is lessened. In sum, for this random GCAC node the key data for the CPS resource has been estimated to be 21 CPS.

Once other GCAC node (114, 122, 124, 132, 134) key data has been weighted, it may be combined with the local GCAC node 112 key data to estimate network-wide key data for each key (and resource) at step 520. For example, in one embodiment the estimated network-wide key data for each key may be calculated by summing the weighted key data values for all external GCAC nodes (114, 122, 124, 132, 134) with any available local GCAC node 112 key data for keys present in the system to calculate the global estimate. The weighting process for remote GCAC nodes (114, 122, 124, 132, 134) produces a value for each resource being calculated and this is used as the assumed value for the resource on the remote GCAC node if a current one is not available. Local GCAC node 112 data is considered to always be current, and no weighted calculation is applied. These values are then added together to total the resource usage value network-wide at the given point in time. The estimation module 230 may then store in local storage 225 the current estimated network-wide resource usage for each key at step 525. The estimation module 230 may then wait for the current interval to expire at step 530 before returning control to step 505 to initiate a new interval.

For example, consider a scenario in which local GCAC node 112 knows its own resource usage for a key (e.g., ABC Co.). For the current interval, ABC Co. may be running at 65 calls per second (CPS) and have 227 concurrent calls (CC). Local GCAC node 112 may have executed the process of FIG. 5 to determine the weighted average resource usage for each of the other GCAC nodes (114, 122, 124, 132, 134) in the network. For illustrative purposes in the current interval, GCAC node 114 has been estimated to be running at 56 CPS and 211 CC, GCAC node 122 has been estimated to be running at 71 CPS and 234 CC, GCAC node 124 has been estimated to be running at 98 CPS and 244 CC, GCAC node 132 has been estimated to be running at 46 CPS and 178 CC, and GCAC node 134 has been estimated to be running at 87 CPS and 223 CC. From the local GCAC node 112 point of view, summing the resource usage for all GCAC nodes including local GCAC node 112 yields an estimated total network-wide resource usage for ABC Co. to be 423 CPS and 1317 CC.

Further assume that ABC Co.'s allocation limits are 400 CPS and 1200 CC. As will be described below in FIG. 6, ABC Co. will be determined to be running at (423/400) or approximately 106% of its CPS limit and (1317/1200) or approximately 110% of its CC limit. Therefore, during the current interval, the decision to grant or deny a resource request made by ABC Co. (the key) to initiate a new call (i.e., CPS) and establish the call (i.e., CC) received by local GCAC node 112 will be determined based on the 106% CPS number and the 110% CC number as described below.

Figure 6:
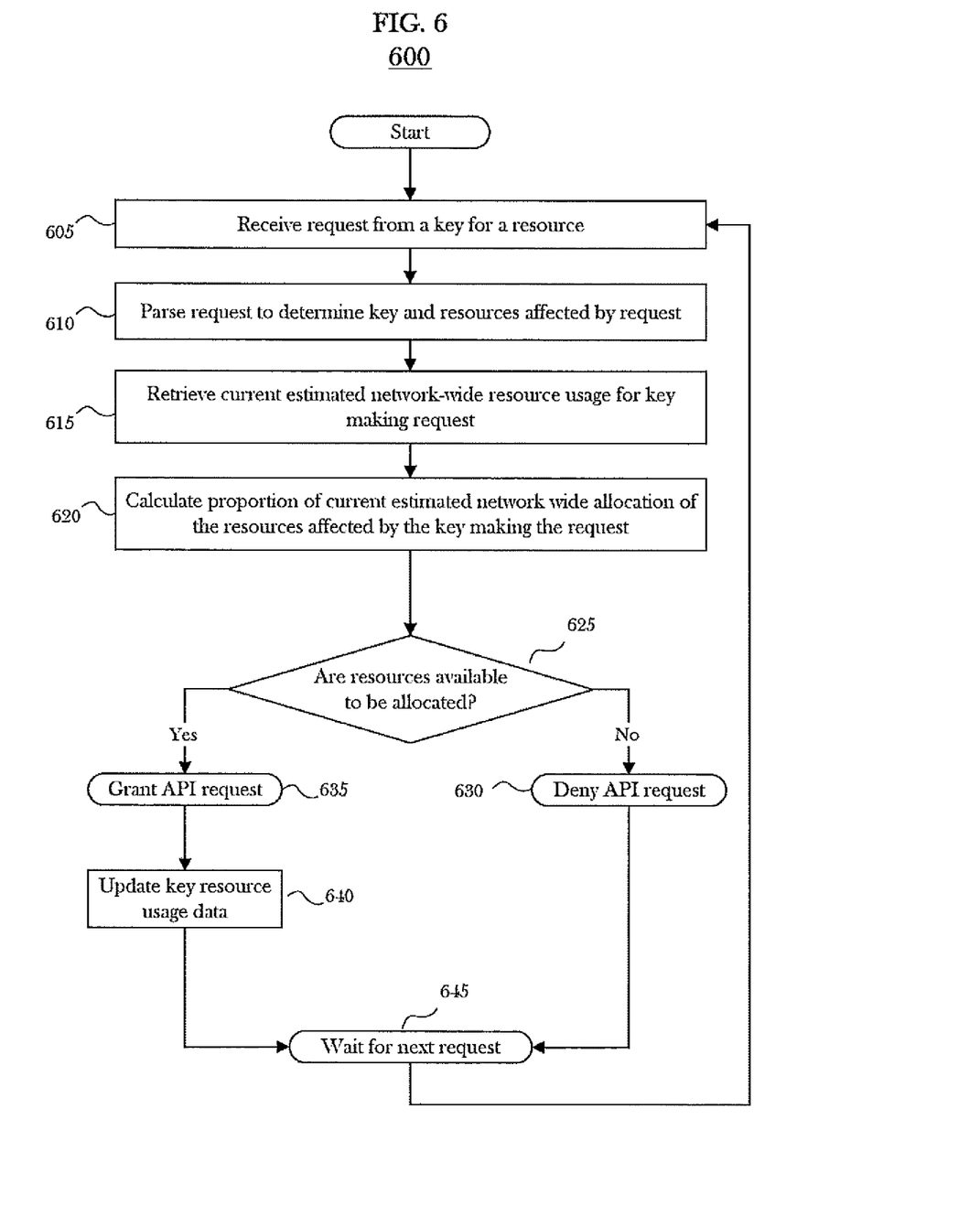
FIG. 6 illustrates a logic flow diagram for handling resource allocation requests at a GCAC node according to an embodiment.

FIG. 6 illustrates a logic flow diagram 600 for handling resource requests at a GCAC node 112 according to an embodiment. The request module 240 within GCAC node 112 may receive a resource request from a key via the API 215 at step 605. More specifically, the resource request may be made over hypertext transfer protocol (HTTP). Once received, the request may be parsed to determine the key and any resource(s) involved at step 610. Next, the request module 240 may retrieve from local storage 225 the current estimated network-vide resource usage for the key making the request at step 615.

Request module 240 may then perform a predictive calculation to determine whether the requested resource is still available to the key making the request that was calculated at step 620. For instance, request module 240 can retrieve from local storage 225 the resource limits for the key making the request Each GCAC node (112, 114, 122, 124, 132, 134) may be provisioned with the key data including resource limits for each key in the system. Request module 240 may then compare the retrieved current estimated network-wide resource usage for the key against the resource limits for the key to determine how much of the resource is still available for use for that key at decision block 625.

For instance, if the resource requested for the key making the request has been estimated to be 80% allocated network-wide, decision block 625 may determine that the key making the request still has resources available to it and allow the request at step 635. However, if the calculation of step 620 along with the determination of decision block 625 determines the key is requesting and using resources at 120% of their allocation limit, request module 240 may then invoke an algorithm that may randomly discard 20% of resource requests in an effort to bring that key's resource allocation closer to its allocation limits. In such a case, there is a 20% chance that each resource request may be rejected at step 630 based on the outcome of decision block 625. If it is not rejected, it is granted at step 635.

In one embodiment, the random selection algorithm may comprise creating a range of 1-100. In the example above, it has been determined that 20% of calls are to be rejected therefore the numbers 1-20 in the range of 1-100 shall represent the resource requests that will be rejected. Each time a relevant resource request is processed by request module 240, request module 240 may utilize a java library, for instance, to generate a uniformly distributed random number between 1-100. Depending on the generated random number, the resource request will be granted at step 635 or denied at step 630. Thus, if the generated random number is between 1-20 inclusive, the resource request will be denied at step 630. On the other hand, if the generated random number is between 21-100 inclusive, the resource request will be granted at step 635. Using the random number generator process just described gives each resource request an equal chance of getting rejected or granted.

If all other GCAC nodes (114, 122, 124, 132, 134) behave in a similar manner, total network-wide resource usage for any given key will converge to within a reasonable tolerance of 100% especially when there are more resource requests made than allowed. Each time a resource request is granted, request module 240 updates the resource usage data for that key at step 640. Typically, this means incrementing or decrementing a counter associated with the resource. After a resource request is granted and updated or denied, request module 240 then waits for the next resource request at step 645. When one is received, control returns to step 605.

Figure 7:
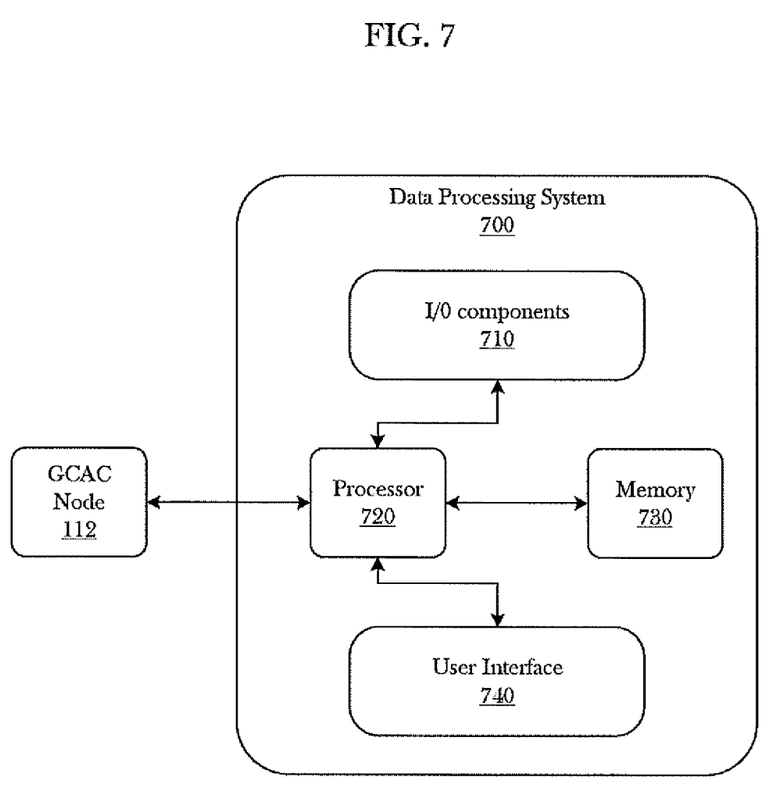
FIG. 7 illustrates an example of a computer based data processing system.

Referring now to FIG. 7, an example of a data processing system 730 suitable for use with any of the examples described above. Although the example data processing system 730 is shown as in communication with the GCAC nodes (112, 114, 122, 124, 132, 134) in accordance with embodiments of the present inventive concept, the data processing system 730 may also be part of the GCAC nodes (112, 114, 122, 124, 132, 134) without departing from the scope of the present inventive concept. In some examples, the data processing system 730 can be any suitable computing device for performing operations according to the embodiments discussed herein described herein.

As illustrated, the data processing system 730 includes a processor 748 communicatively coupled to I/O components 746, a user interface 744 and a memory 736. The processor 748 can include one or more commercially available processors, embedded processors, secure processors, microprocessors, dual microprocessors, multi-core processors, other multi-processor architectures, another suitable processing device, or any combination of these. The memory 736, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 730.

I/O components 746 may be used to facilitate wired or wireless connections to devices such as one or more displays, game controllers, keyboards, mice, joysticks, cameras, buttons, speakers, microphones and/or other hardware used to input or output data. Memory 736 represents nonvolatile storages such as magnetic, optical, or other storage media included in the data processing system and/or coupled to processor 748.

The user interface 744 may include, for example, a keyboard, keypad, touchpad, voice activation circuit, display or the like and the processor 748 may execute program code or instructions stored in memory 736.

It should be appreciated that data processing system 730 may also include additional processors, additional storage, and a computer-readable medium (not shown). The processor(s) 748 may execute additional computer-executable program instructions stored in memory 736. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola DragonBall® and PowerPC® processors; IBM and Sony® Cell processors; Qualcomm® Snapdragon®, Intel@ Celeron®, Core (2) Duo®, Core i8, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash dies, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The de % ices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method of allocating and managing resources associated with keys in a communications network spread across a plurality of data centers in different geographic locations wherein each data center includes one or more global call access control (GCAC) nodes networked together and communicable with one another across all data centers, the method comprising:

during a repeating interval in a local GCAC node:
(a) receiving and storing key data from one or more other GCAC nodes, the key data indicative of resource usage data for each key in the respective one or more other GCAC nodes wherein each key is associated with an allocation limit equal to a number of resources it may use at any given time across all GCAC nodes;
(b) storing current key data, the current key data indicative of the resource usage data for each key in the local GCAC node;

(c) determining estimated network-wide key data, the estimated network-wide key data indicative of an estimated network-wide resource usage across all GCAC nodes for each key, the estimated network-wide key data based on a combination of the current key data for the local GCAC node and a weighted multiple of the key data in each of the one or more other GCAC nodes;

(d) storing the estimated network-wide key data for each key;

repeating steps (a)-(d) during each interval; and in the local GCAC node:

receiving a request from a key for a resource;

parsing the request to identify the key and the resource requested;

retrieving the estimated network-wide key data for the key making the request;

determining a resource usage percentage for the resource requested based on the ratio between the estimated network-wide key data for the key making the request and the allocation limit for the key making the request;

granting the request for the resource when the resource usage percentage is less than or equal to 100%; and when the resource usage percentage is greater than 100%:

creating a number range between 1 and 100;

creating a sub range from 1 to (the resource usage percentage—100)

generating a random number between 1 and 100; and rejecting the request for the resource when the random number is in the sub range.

2. The method of claim 1, the estimated network-wide key data calculated for each key by:

determining the current usage for each resource for each key in the local GCAC node;

determining a current estimate of the usage for each resource for each key in each of the one or more other GCAC nodes; and summing the local GCAC node resource usage for each resource for each key and the current estimate of resource usage in each of the one or more other GCAC nodes for each resource for each key to obtain an estimated network-wide resource usage for each resource for each key.

3. The method of claim 2, the determining a current estimate of the usage for each resource for a key in each of the one or more other GCAC nodes comprising:

determining a decay factor (DF) equal to 1/(historical event window size), wherein the historical event widow size further determines a number of look back intervals relevant to determining the current estimate of the usage of a resource;

starting with the current interval and incrementing through each of the lookback intervals from most recent to least recent:

(a) retrieving a value (V) for resource usage data present during the interval;

(b) applying a weighting factor (WF) of DF whenever V is zero for an interval;

(c) applying a weighting factor (WF) of 1 to V for the first interval where V is not zero, and resetting the WF to (WF-DF) for the next interval in which V is not zero;

(d) calculating (WF×V) to obtain a weighted resource usage data value (WV) for each interval;

(e) repeating steps (a)-(d) until there is a WV and a WF for each interval for the resource;

(f) calculating the current estimate of the usage for a resource as (Σ of WVs for each interval)/(Σ of WFs for each interval); and (g) repeating steps (a)-(f) for each resource for each key for each of the one or more other GCAC nodes.

4. The method of claim 1, comprising:

during each interval:

randomly selecting a predetermined number of other GCAC nodes to which to send the current key data during a present interval;

determining whether any of the randomly selected other GCAC nodes were sent then current key data in an immediately preceding interval;

when a selected other GCAC node was sent then current key data in the immediately preceding interval, then randomly selecting another GCAC node until all the currently selected other GCAC nodes are different from the other GCAC nodes sent then current key data in the immediately preceding interval; and sending the current key data to the selected other GCAC nodes.

5. The method of claim 1, comprising:

updating the current key data for a key each time a resource associated with that key is allocated or de-allocated by the local GCAC node.

6. The method of claim 1, the request comprising an application programming interface (API) request.

7. The method of claim 1, wherein the key represents a customer utilizing the communications network.

8. The method of claim 1, wherein the resource is indicative of a number of calls the key can attempt per second (CPS) on the communications network.

9. The method of claim 1, wherein the resource is indicative of a number of concurrent calls (CC) the key can maintain on the communications network at any given moment.

10. A non-transitory computer-readable medium storing a set of instructions, the set of instructions comprising:

one or more instructions that, when executed by one or more processors of a local global call access control (GCAC) node, cause the local GCAC node to:

during a repeating interval:

(a) receive and store key data from one or more other GCAC nodes, the key data indicative of resource usage data for each key in the respective one or more other GCAC nodes wherein each key is associated with an allocation limit equal to a number of resources it may use at any given time across all GCAC nodes;

(b) store current key data, the current key data indicative of the resource usage data for each key in the local GCAC node;

(c) determine estimated network-wide key data, the estimated network-wide key data indicative of an estimated network-wide resource usage across all GCAC nodes for each key, the estimated network-wide key data based on a combination of the current key data for the local GCAC node and a weighted multiple of the key data in each of the one or more other GCAC nodes;

(d) store the estimated network-wide key data for each key; and repeat steps (a)-(d) during each interval; and receive a request from a key for a resource;

parse the request to identify the key and the resource requested;

retrieve the estimated network-wide key data for the key making the request;
determine a resource usage percentage for the resource requested based on the ratio between the estimated network-wide key data for the key making the request and the allocation limit for the key making the request;
grant the request for the resource when the resource usage percentage is less than or equal to 100%; and
when the resource usage percentage is greater than 100%:
create a number range between 1 and 100;
create a sub range from 1 to (the resource usage percentage—100)
generate a random number between 1 and 100; and
reject the request for the resource when the random number is in the sub range.

11. The non-transitory computer-readable medium of claim 10, the one or more instructions when executed by one or more processors of a local global call access control (GCAC) node that cause the local GCAC node to determine the estimated network-wide key data, to:
determine the current usage for each resource for each key in the local GCAC node; determine a current estimate of the usage for each resource for each key in each of the one or more other GCAC nodes; and
sum the local GCAC node resource usage for each resource for each key and the current estimate of resource usage in each of the one or more other GCAC nodes for each resource for each key to obtain an estimated network-wide resource usage for each resource for each key.

12. The non-transitory computer-readable medium of claim 11, the one or more instructions when executed by one or more processors of a local global call access control (GCAC) node that cause the local GCAC node to determine a current estimate of the usage for each resource for a key in each of the one or more other GCAC nodes, to:
determine a decay factor (DF) equal to 1/(historical event window size), wherein the historical event widow size further determines a number of look back intervals relevant to determining the current estimate of the usage of a resource;
starting with the current interval and incrementing through each of the lookback intervals from most recent to least recent:
(a) retrieve a value (V) for resource usage data present during the interval;
(b) apply a weighting factor (WF) of DF whenever V is zero for an interval;
(c) apply a weighting factor (WF) of 1 to V for the first interval where V is not zero, and resetting the WF to (WF-DF) for the next interval in which V is not zero;
(d) calculate (WF×V) to obtain a weighted resource usage data value (WV) for each interval;
(e) repeat steps (a)-(d) until there is a WV and a WF for each interval for the resource;
(f) calculate the current estimate of the usage for a resource as ($\Sigma$ of WVs for each interval)/($\Sigma$ of WFs for each interval); and
(g) repeat steps (a)-(f) for each resource for each key for each of the one or more other GCAC nodes.

13. The non-transitory computer-readable medium of claim 10, the one or more instructions when executed by one or more processors of a local global call access control (GCAC) node to:
during each interval:
randomly select a predetermined number of other GCAC nodes to which to send the current key data during a present interval;
determine whether any of the randomly selected other GCAC nodes were sent then current key data in an immediately preceding interval;
when a selected other GCAC node was sent then current key data in the immediately preceding interval, then randomly select another GCAC node until all the currently selected other GCAC nodes are different from the other GCAC nodes sent then current key data in the immediately preceding interval; and
send the current key data to the selected other GCAC nodes.

14. The non-transitory computer-readable medium of claim 10, the one or more instructions when executed by one or more processors of a local global call access control (GCAC) node to:
update the current key data for a key each time a resource associated with that key is allocated or de-allocated by the local GCAC node.

15. The non-transitory computer-readable medium of claim 10, the request comprising an application programming interface (API) request.

16. The non-transitory computer-readable medium of claim 10, wherein the key represents a customer utilizing the communications network.

17. The non-transitory computer-readable medium of claim 10, wherein the resource is indicative of a number of calls the key can attempt per second (CPS) on the communications network.

18. The non-transitory computer-readable medium of claim 10, wherein the resource is indicative of a number of concurrent calls (CC) the key can maintain on the communications network at any given moment.

19. A computer, comprising:
one or more memories; and
one or more processors, communicatively coupled to the one or more memories, configured to:
during a repeating interval in a local GCAC node:
(a) receive and store key data from one or more other GCAC nodes, the key data indicative of resource usage data for each key in the respective one or more other GCAC nodes wherein each key is associated with an allocation limit equal to a number of resources it may use at any given time across all GCAC nodes;
(b) store current key data, the current key data indicative of the resource usage data for each key in the local GCAC node;
(c) determine estimated network-wide key data, the estimated network-wide key data indicative of an estimated network-wide resource usage across all GCAC nodes for each key, the estimated network-wide key data based on a combination of the current key data for the local GCAC node and a weighted multiple of the key data in each of the one or more other GCAC nodes;
(d) store the estimated network-wide key data for each key; and
repeat steps (a)-(d) during each interval; and
in the local GCAC node:
receive a request from a key for a resource;
parse the request to identify the key and the resource requested;
retrieve the estimated network-wide key data for the key making the request;
determine a resource usage percentage for the resource requested based on the ratio between the estimated network-wide key data for the key making the request and the allocation limit for the key making the request;
grant the request for the resource when the resource usage percentage is less than or equal to 100%; and
when the resource usage percentage is greater than 100%:
create a number range between 1 and 100;
create a sub range from 1 to (the resource usage percentage—100) generate a random number between 1 and 100; and
reject the request for the resource when the random number is in the sub range.

20. The computer of claim 19, one or more processors, communicatively coupled to the one or more memories, configured to:
determine the current usage for each resource for each key in the local GCAC node;
determine a current estimate of the usage for each resource for each key in each of the one or more other GCAC nodes; and
sum the local GCAC node resource usage for each resource for each key and the current estimate of resource usage in each of the one or more other GCAC nodes for each resource for each key to obtain an estimated network-wide resource usage for each resource for each key.

21. The computer of claim 20, the one or more processors, communicatively coupled to the one or more memories, configured to:
determine a decay factor (DF) equal to 1/(historical event window size), wherein the historical event widow size further determines a number of look back intervals relevant to determining the current estimate of the usage of a resource;
starting with the current interval and incrementing through each of the lookback intervals from most recent to least recent:
(a) retrieve a value (V) for resource usage data present during the interval;
(b) apply a weighting factor (WF) of DF whenever V is zero for an interval;
(c) apply a weighting factor (WF) of 1 to V for the first interval where V is not zero, and resetting the WF to (WF-DF) for the next interval in which V is not zero;
(d) calculate (WF×V) to obtain a weighted resource usage data value (WV) for each interval;
(e) repeat steps (a)-(d) until there is a WV and a WF for each interval for the resource;
(f) calculate the current estimate of the usage for a resource as ($\Sigma$ of WVs for each interval)/($\Sigma$ of WFs for each interval); and
(g) repeat steps (a)-(f) for each resource for each key for each of the one or more other GCAC nodes.

22. The computer of claim 19, the one or more processors, communicatively coupled to the one or more memories, configured to:
during each interval:
randomly select a predetermined number of other GCAC nodes to which to send the current key data during a present interval;
determine whether any of the randomly selected other GCAC nodes were sent then current key data in an immediately preceding interval;
when a selected other GCAC node was sent then current key data in the immediately preceding interval, then randomly select another GCAC node until all the currently selected other GCAC nodes are different from the other GCAC nodes sent then current key data in the immediately preceding interval; and
send the current key data to the selected other GCAC nodes.

23. The computer of claim 19, the one or more processors, communicatively coupled to the one or more memories, configured to:
update the current key data for a key each time a resource associated with that key is allocated or de-allocated by the local GCAC node.

24. The computer of claim 19, the request comprising an application programming interface (API) request.

25. The computer of claim 19, wherein the key represents a customer utilizing the communications network.

26. The computer of claim 19, wherein the resource is indicative of a number of calls the key can attempt per second (CPS) on the communications network.

27. The computer of claim 19, wherein the resource is indicative of a number of concurrent calls (CC) the key can maintain on the communications network at any given moment.

* * * * *